March 10, 1953  W. F. ELSHOLZ  2,631,256
CARBON SAVER
Filed Dec. 17, 1951
Fig.1
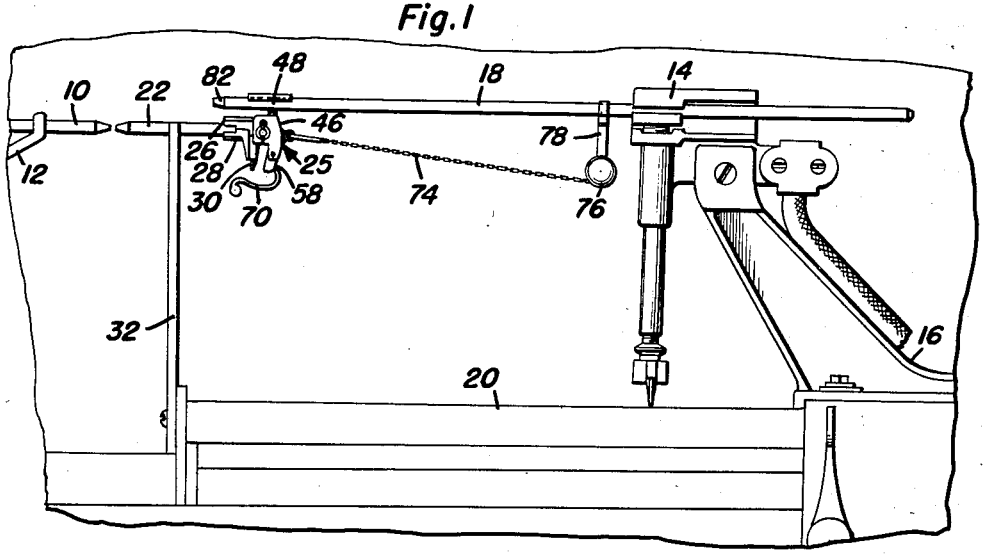
Fig.2
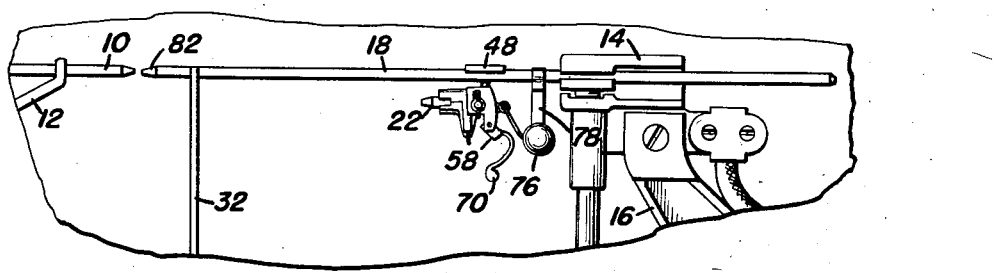
Fig.4 Fig.6 Fig.5 Fig.3
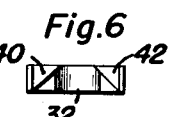
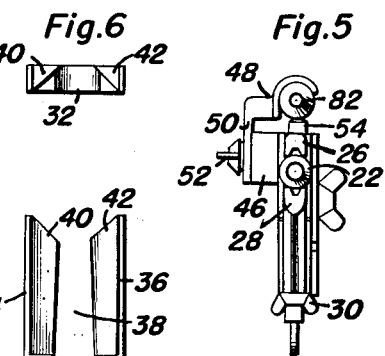
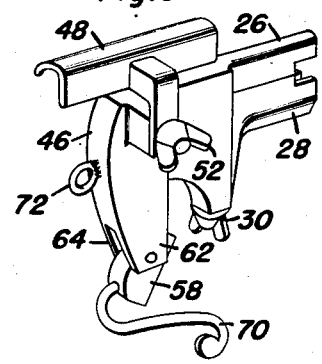
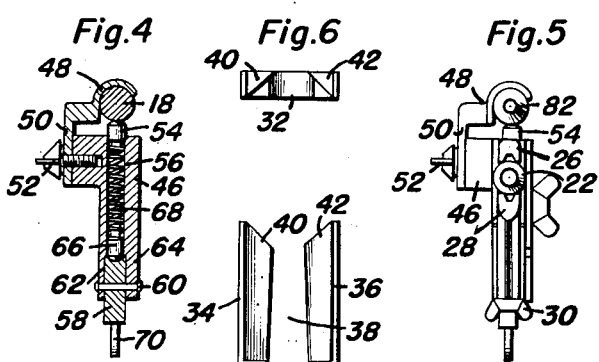
Fig.7
Walter Fred Elsholz
INVENTOR.
BY Clarence A. O'Brien
and Harvey B. Jacobson
Attorneys Patented Mar. 10, 1953

2,631,256

UNITED STATES PATENT OFFICE 2,631,256

CARBON SAVER

Walter Fred Elsholz, Caldwell, Idaho

Application December 17, 1951, Serial No. 261,959

7 Claims. (Cl. 314—1)

This invention relates to a carbon saver and particularly to a carbon holder for using up small bits of positive carbon in a motion picture projector lamp.

In the operation of motion picture projectors it is customary to provide the necessary intense light by means of a carbon arc light. In the utilization of such devices the positive carbon is rapidly used up in the intense heat of the arc. In operation it is highly undesirable to stop and change carbons during the progress of a reel so that if a positive carbon is not of sufficient length to run a full reel it must be discarded and a new or fresh carbon inserted in the holder. This results in a material waste as a large portion of the carbon must be discarded without being fully utilized.

The present invention provides a carbon holder which is adapted to utilize small bits of carbon and transfer the arc to a fresh carbon without extinguishing the light.

This is accomplished according to the invention by an auxiliary holder which is clamped onto the fresh carbon and is of such dimensions that when the carbon piece has been used or passed through the carbon guide the auxiliary holder will drop down and allow the fresh carbon to rest on the guide in arcing distance to the stationary electrode. A trigger arrangement will release the clamp to the fresh carbon and allow the carbon to be fed through without interference with the clamp.

Because of the intense heat in the vicinity of the arc it is desirable to remove the auxiliary carbon holder from the immediate vicinity of the arc and for this reason a retriever spring is preferably attached to the auxiliary holder so that when it is released from the fresh carbon it will be retrieved or moved out of proximity to the arc space.

It is accordingly an object of this invention to provide a carbon saver.

It is a further object of this invention to provide an auxiliary clamp for holding and pushing another carbon.

It is a further object of this invention to provide a carbon holder which will utilize short pieces of carbon and then transfer the arc to a fresh carbon.

It is a further object of this invention to provide an auxiliary carbon holder which will be clamped onto the fresh carbon and released by the utilization of the carbon piece.

It is a further object of this invention to provide a carbon holder which will be released and retrieved when a carbon piece held thereby has been consumed.

Other objects and many of the attendant advantages of this invention will be apparent from the following detailed description taken in conjunction with the accompanying drawings in which:

Figure 1 is a side view of the electrode arrangement of a motion projector lamp showing the carbon saver in operation;

Figure 2 is a similar view showing the carbon saver retrieved;

Figure 3 is a perspective view of the carbon saver as viewed from the back;

Figure 4 is a cross section through the trigger mechanism and taken substantially on the plane indicated by the line 4—4 of Figure 1;

Figure 5 is a front elevational view of the carbon saver in operation position;

Figure 6 is a top plan view of the carbon guide; and

Figure 7 is a front elevation of the carbon guide.

In the exemplary embodiment of the invention a stationary negative electrode 10 is mounted in a holder 12 while a clamp jaw 14 mounted on a carriage 16 carries a fresh carbon 18. As is well known in the art the carriage 16 advances on the track 20 to feed the carbon 18 as it is consumed.

In order to utilize the short pieces 22 of carbon rod which are of insufficient length to operate a full reel the invention provides a clamp generally indicated at 25 having an upper fixed jaw 26 and a lower movable jaw 28, the jaw 28 being moved in a direction of the jaw 26 by means of a tensioning screw 30. The jaws 26 and 28 are of slightly less width than the carbon 22 for a purpose presently to be described.

In order to maintain a movable carbon in perfect alignment with the fixed electrode 10 a carbon guide 32 is mounted in the lamp in proximity to the point of the arc between the electrode 10 and carbon 22. The top of the guide 32 is bifurcated and provided with a pair of extending legs 34 and 36 with bifurcation 38 therebetween. The tops of the legs 34 and 36 are beveled inwardly to provide guide surfaces 40 and 42, said guide surfaces being in communication with the bifurcation 38. Bifurcation 38 at the point of communication with the guide surfaces 40 and 42 is of less width than the carbon piece 22 but of greater width than the jaws 26 and 28.

The present saver 25 is provided with a body 46, a clamp jaw 48 has a depending flange 50 clamped to the body 46 by means of a clamp screw 52. The clamp screw 52 may be loosened and the holder jaws 26 and 28 properly aligned with the carbon 22 so that the carbon 22 will be in proper alignment with the negative electrode 10. A plunger 54 is mounted in a transverse bore 56 of the body 46. A sear block 58 is pivoted on the rivet 60 between arms 62 and 64 at the bottom of the body 46. A plunger 66 in the lower end of the bore 56 makes contact with the sear block 58 so that the sear block is in top position the plunger 66 will be elevated. The spring 68 is mounted between the plungers 54 and 66 so that when the sear block is cocked the plunger 66 will be passed into clamping engagement with the electrode 18.

The sear block 58 is provided with a trigger 70 which will make contact with the guide 32 to trip the sear block 58 and release the pressure on the plunger 54 to release the clamp 48 from the electrode 18.

An attachment ring 72 is secured to the body 46 in any convenient manner such as welding and a flexible tension element such as a cable or chain 74 is attached thereto. The rear end of the flexible element 74 is wound on a spool in a container 76 mounted on a clamp 78 which can be secured to any convenient portion of the device such as the base of a fresh carbon 18.

In the operation of the device a fresh carbon will be mounted in the jaw 14 of the carriage 16 which will advance the carbon over the track 20 in a manner as is well known. Carbon saver 25 is attached to a fresh carbon 18 by means of the clamp 38 and the plunger 54 by setting the sear block to compress with the spring 68. The clamp 48 is so positioned on the carbon 18 that the jaws 26 and 28 of the auxiliary holder are mounted just below and just back of the point 82 of the fresh carbon. A small piece of carbon 22 is mounted between the jaws 26 and 28 and extends across the guide surfaces 40 and 42 and the holder is aligned by means of a screw 52 so that the piece 22 is in correct alignment with the negative electrode 10. The arc is then struck between the negative electrode and the portion of the carbon 22 and the same is advanced by the carriage 16 as it is consumed. When all of the carbon 22 that is practical to consume has been used the jaws 26 and 28 will ride onto the guide surfaces 40 and 42 and since they are narrower than the bifurcation 38 the auxiliary jaws will drop into the bifurcation 38 so that the fresh carbon 18 will be mounted on the guide surfaces 40 and 42 in proper position for striking the arc to the electrode 10. At this juncture the trigger 70 makes contact with the stem of the guide 32 and trips the sea block 58 to release the pressure on the plunger 54 and allow the clamp to be released from the electrode 18. Upon the release of the clamp 48 the spring in the spool 76 will retrieve the holder 25 so that it slides out of the vicinity of the arc and will not therefore be damaged by excessive heat or interfere with the maintenance of the arc.

It will thus be seen that this invention provides a means for utilizing short carbons so that there is no waste of carbon because of the necessity of an arc through the continuous performance of a reel.

While for purposes of exemplification a particular embodiment of the invention has been shown, and described according to the best present understanding thereof, it will be apparent to those skilled in the art, that many changes and modifications can be made therein without departing from the true spirit of the invention.

Having described the invention, what is claimed as new is:

1. In a projector lamp having a negative electrode holder and a carbon electrode feeder, a carbon saver comprising an auxiliary carbon holder, a clamp securing said auxiliary carbon holder on the carbon held in the carbon feeder, said auxiliary holder having a carbon held thereby, a trip for releasing the clamp securing said auxiliary holder on said carbon held by said feeder.

2. In a projector lamp having a negative electrode holder and a carbon electrode feeder, a carbon saver comprising an auxiliary carbon holder, a clamp securing said auxiliary carbon holder on the carbon held in the carbon feeder, said auxiliary holder having a carbon held thereby, means for releasing said auxiliary holder from said carbon held by said feeder, and resilient means sliding said auxiliary holder on said carbon held by said carbon feeder.

3. In a projector lamp having a fixed negative electrode and a feeding holder for feeding a carbon electrode as it is consumed, a carbon saver comprising a carbon guide in proximity to the arc gap of said lamp, said guide including a bifurcated top, a guide surface on said top, said guide surface being in communication with said bifurcation, said bifurcation at the point of communication being of less width than the diameter of the carbon, an auxiliary carbon holder, a spring biased clamp holding said auxiliary holder on a carbon held by said feeding holder, a short carbon held in said auxiliary holder and seated on said guide, said auxiliary holder being narrower than said bifurcation, a trip operative to release said clamp when said auxiliary holder enters said bifurcation.

4. In a projector lamp having a fixed negative electrode and a feeding holder for feeding a carbon electrode as it is consumed, a carbon saver comprising a carbon guide in proximity to the arc gap of said lamp, said guide including a bifurcated top, a guide surface on said top, said guide surface being in communication with said bifurcation, said bifurcation at the point of communication being of less width than the diameter of the carbon, an auxiliary carbon holder, a spring biased clamp holding said auxiliary holder on a carbon held by said feeding holder, a short carbon held in said auxiliary holder and seated on said guide, said auxiliary holder being narrower than said bifurcation, a trigger on said auxiliary holder, said trigger being tripped by contact with said guide, said trigger when tripped releasing said spring biased clamp.

5. In a projector lamp having a fixed negative electrode and a feeding holder for feeding a carbon electrode as it is consumed, a carbon saver comprising a carbon guide in proximity to the arc gap of said lamp, said guide including a bifurcated top, a guide surface on said top, said guide surface being in communication with said bifurcation, said bifurcation at the point of communication being of less width than the diameter of the carbon, an auxiliary carbon holder, a spring biased clamp holding said auxiliary holder on a carbon held by said feeding holder, a short carbon held in said auxiliary holder and seated on said guide, said auxiliary holder being narrower than said bifurcation, a trigger on said auxiliary holder, said trigger being tripped by contact with said guide, said trigger when tripped releasing said spring biased clamp, a spring operated means retrieving said auxiliary holder upon release of said spring biased clamp.

6. In a projector lamp having a fixed negative electrode and a feeding holder for feeding a carbon electrode as it is consumed, a carbon saver comprising a carbon guide in proximity to the arc gap of said lamp, said guide including a bifurcated top, a guide surface on said top, said guide surface being in communication with said bifurcation, said bifurcation at the point of communication being of less width than the diameter of the carbon, an auxiliary carbon holder, said auxiliary holder including a pair of jaws, a screw forcing said jaws together to hold a partially consumed carbon, said jaws being of less width than said carbon, a clamp overlying a fresh carbon in said feeding holder, a spring pressed plunger transverse of said holder and below said clamp, a sear block operable to compress said spring, said spring urging said plunger into clamping relation with said fresh carbon, a trigger connected to said sear block.

7. In a projector lamp having a fixed negative electrode and a feeding holder for feeding a carbon electrode as it is consumed, a carbon saver comprising a carbon guide in proximity to the arc gap of said lamp, said guide including a bifurcated top, a guide surface on said top, said guide surface being in communication with said bifurcation, said bifurcation at the point of communication being of less width than the diameter of the carbon, an auxiliary carbon holder, said auxiliary holder including a pair of jaws, a screw forcing said jaws together to hold a partially consumed carbon, said jaws being of less width than said carbon, a clamp overlying a fresh carbon in said feeding holder, a spring pressed plunger transverse of said holder and below said clamp, a sear block operable to compress said spring, said spring urging said plunger into clamping relation with said fresh carbon, a trigger connected to said sear block, a spring operator bobbin clamped on said fresh carbon adjacent said feeder holder, a flexible tension secured to said bobbin and said auxiliary holder.

WALTER FRED ELSHOLZ.

REFERENCES CITED

The following references are of record in the file of this patent:

UNITED STATES PATENTS

| Number | Name | Date |
|---|---|---|
| 2,269,771 | Klamm | Jan. 13, 1942 |
| 2,362,281 | Kuehl | Nov. 7, 1944 |
| 2,375,476 | Hunt | May 8, 1945 |